(12) United States Patent
Kazama et al.

(10) Patent No.: US 6,432,519 B1
(45) Date of Patent: Aug. 13, 2002

(54) INK JET RECORDING SHEET

(75) Inventors: Kenichi Kazama; Yuichiro Maehara, both of Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/545,160

(22) Filed: Apr. 7, 2000

(30) Foreign Application Priority Data

Apr. 16, 1999 (JP) .......................................... 11-109151

(51) Int. Cl.[7] .............................. B32B 27/14; B32B 3/00
(52) U.S. Cl. ....................... 428/195; 428/219; 428/213; 428/340
(58) Field of Search ................................ 428/195, 219, 428/213, 340

(56) References Cited

FOREIGN PATENT DOCUMENTS

EP          0 696 516 A1  *  2/1996

* cited by examiner

Primary Examiner—Bruce H. Hess
Assistant Examiner—B. Shewareged
(74) Attorney, Agent, or Firm—Bierman, Muserlian and Lucas

(57) ABSTRACT

An ink jet recording medium, comprises a support; a first layer provided on the support; and a second layer provided on the first layer so as to come in contact with the first layer, the second layer being an ink absorbing layer. The Young's modulus of the first layer is smaller than the Young's modulus of the second layer.

16 Claims, No Drawings

INK JET RECORDING SHEET

BACKGROUND OF THE INVENTION

The present invention relates to an ink jet recording sheet and, in more detail, to an ink jet recording sheet which results in fewer cracks, and exhibits excellent coated film strength as well as excellent gloss.

Ink jet recording systems produce little noise, and are capable of carrying out high-speed recording as well as multicolor imaging. Accordingly, they are employed in many fields, such as various types of printers, plotters, and the like.

An ink jet recording sheet is commonly constituted in such a manner that an ink absorptive layer (absorbing layer) is applied via a sublayer (subbing layer) onto a support, utilizing various types of paper such as wood-free paper, coated paper, and the like, synthetic paper, plastic films, and the like.

Most of the ink absorptive layers are comprised of fine solid particles in order to enhance ink absorbability by increasing the void ratio and to simultaneously provide sufficient ink fixability. The ink absorptive layer is commonly comprised of polymeric compounds as the binder, into which said fine solid particles are mixed and evenly dispersed. In order to uniformly coat such dispersion, as well as to enhance adhesion of the ink absorptive layer with the aforementioned support, a sublayer is commonly applied onto the support and thereon the ink absorptive layer is applied.

For the purpose of improving adhesion, as well as for carrying out uniform coating, frequently employed as such sublayers have been those comprised of water-soluble polymers. Such water-soluble polymers are employed to assure affinity with water-soluble polymers which are frequently employed as binders in the ink absorptive layer. Of these, gelatin is often employed to prepare the sublayer. However, a sublayer comprised of gelatin is not capable of sufficiently relaxing the contraction force which is generated in the interface between the sublayer and the ink absorptive layer during drying of the ink absorptive layer. As a result, problems occur in which the ink absorptive layer peels from the support, resulting in cracks.

SUMMARY OF THE INVENTION

Accordingly, an object of the present invention is to obtain an ink jet recording sheet which results in a decrease in minute cracks during drying, and exhibits excellent coated film strength as well as excellent gloss.

The object of the present invention can be achieved by the following structures or methods:

(1-1) An ink jet recording medium, comprises:
  a support;
  a first layer provided on the support; and
  a second layer provided on the first layer so as to come in contact with the first layer, the second layer being an ink absorbing layer,
  wherein an elastic modulus of the first layer is smaller than a Young's modulus of the second layer.
(1-2) In the ink jet recording medium of (1-1), the first layer is a subbing layer.
(1-3) In the ink jet recording medium of (1-1), the second layer comprises a void structure.
(1-4) In the ink jet recording medium of (1-1), the first layer comprises an organic polymer and the second layer contains the same organic polymer as that of the first layer.
(1-5) In the ink jet recording medium of (1-1), the first layer contains polyvinyl alcohol.
(1-6) In the ink jet recording medium of (1-1), a coating weight of the first layer is 0.03 g/m$^2$ to 0.4 g/m$^2$.
(1-7) In the ink jet recording medium of (1-1), a thickness of the second layer is 5 $\mu$m to 50 $\mu$m.
(1-8) In the ink jet recording medium of (1-1), a thickness of the first layer is 0.03 $\mu$m to 0.4 $\mu$m.
(1-9) In the ink jet recording medium of (1-1), a thickness of the second layer is larger 10 times or more than that of the first layer.
(1-10) A method of manufacturing an ink jet recording medium, comprises:
  a step of providing a second layer on a first layer provided on a support, wherein the second layer is an ink absorbing layer and has a Young's modulus larger that that of the first layer.
(1-11) In the method of (1-10), the step of providing the second layer comprises a step of coating a coating solution on the first layer and a step of drying the coating solution so as to obtain the second layer.
(1-12) In the method of (1-10), the method further comprises a step of providing the first layer before the step of providing the second step.
(1-13) In the method of (1-10), the first layer is a subbing layer.
(1-14) In the method of (1-10), the second layer is provided by simultaneously coating with the firs layer so as to form a multi layer.
(1-15) In the method of (1-10), the simultaneously coating is conducted with a curtain coater.
(1-16) In the method of (1-10), the simultaneously coating is conducted with a slide coater.

Further, the object of the present invention may be achieved by the preferable means or methods described below:

(2-1) In an ink jet recording sheet comprising a support having thereon a sublayer and thereon an ink absorptive layer in contact with said sublayer, an ink jet recording sheet characterized in that the Young's modulus of said sublayer is less than said ink absorptive layer.
(2-2) The ink jet recording sheet described in (2-1), characterized in that said sublayer is comprised of polyvinyl alcohol.
(2-3) The ink jet recording sheet described in (2-1) or (2-2), wherein the weight of said coated sublayer is between 0.03 and 0.4 g/m$^2$.
(2-4) A coating method of an ink jet recording sheet characterized in that the sublayer and the ink absorptive layer of the ink jet recording sheet, described in 1., 2., or 3. above, are simultaneously coated as multiple layers.
(2-5) The coating method of the ink jet recording sheet described in (2-4), characterized in employing a curtain coater.
(2-6) The coating method of an ink jet recording sheet described in (2-4), characterized in employing a slide coater.

DETAILED DESCRIPTION OF THE PREFERRED EMBODIMENT

The present invention will now be detailed below.

In view of the foregoing, the present inventors have diligently investigated and have accomplished the present invention. Namely, it has been discovered that minute cracks formed during drying are due to stress generated in the interface between the ink absorptive layer and the sublayer during drying, and the relaxation of said stress markedly decreases cracks. According to the present invention, said stress generated in the interface between said sublayer and said ink absorptive layer is effectively relaxed by employing a sublayer having a lower Young's modulus. Further, when setting a lower Young's modulus in the sublayer compared to the ink absorptive layer, the desired effects are exhibited. Accordingly, still more preferable effects are exhibited by replacing gelatin in the sublayer with, for example, polyvinyl alcohol, having a lower Young's modulus than gelatin.

The Young's modulus of each layer is measured as follows. Each coating solution is applied onto the surface of a polypropylene plate and subsequently dried. The coated layer is then peeled off and a 200 μm thick layer is prepared. The Young's modulus of the resulting layer is measured in a room conditioned at 25° C. and 60% RH.

The Young's modulus of the ink absorptive layer is preferably adjusted to the range of 50 to 100 kg/mm$^2$, while that of the sublayer is preferably adjusted to the range of 20 to 100 kg/mm$^2$, which is less than the ink absorptive layer.

By so doing, an ink jet recording sheet is obtained which results in a decrease in cracks and exhibits excellent coated film strength, as well as excellent gloss.

In order to adjust the Young's modulus of the sublayer to be lower than the ink absorptive layer, materials may be selected and combined so that such relationship as described above is obtained. Further, coating solutions may be prepared by incorporating into each coating solution materials which control the Young's modulus. The materials, which control the Young's modulus, may be incorporated into either the ink absorptive layer or the sublayer. However, they are preferably incorporated into the sublayer so that a decrease in ink absorbability of the ink absorptive layer is as small as possible.

Further, the weight of the coated sublayer, comprised of said polyvinyl alcohols and the like, is preferably in the dried weight range of 0.03 to 0.4 g/m$^2$. When the coated weight is below this range, it is impossible to efficiently relax the resulting stress, while, when it is above this range, surface gloss is lost. Further, the thickness of the sublayer is preferably between 0.03 and 0.4 μm for the same reasons.

Polyvinyl alcohols, which are preferably employed in the present invention, have a degree of saponification of 70 to 100 percent and a degree of polymerization of 100 to 5000, preferably not greater than 3000, being obtained from polyvinyl acetate. Those, which have a degree of saponification of at least 85 mole percent, as well as a degree of polymerization of at least 200, preferably not smaller than 1000, are preferred. Such polyvinyl alcohols are readily available on the market, as products from, for example, Kuraray Co., Nihon Gosei Co., and the like.

The polyvinyl alcohols employed in the present invention include, in addition to common polyvinyl alcohols obtained by hydrolyzing polyvinyl acetate, carboxyl modified polyvinyl alcohols, polyvinyl alcohols substituted with alkyl groups at the terminals, silanol modified polyvinyl alcohols, polyvinyl alcohols modified with cations at the terminals, anionic modified polyvinyl alcohols having anionic groups. Of these, silanol modified polyvinyl alcohols are particularly preferred.

The ink absorptive layer may be either a swelling type in which the binder itself swells and absorbs the majority of the ink, or an ink absorptive layer having a void structure in its layer to which ink is absorbed in such a manner that said ink is accommodated primarily in the voids. The ink absorptive layer preferably has said void structure. Cracks tend to be formed due to the presence of the void structure. However, such cracks may be markedly minimized by applying the present invention.

The void ratio is preferably between 40 and 80 percent, and is most preferably between 50 and 70 percent. The void ratio as described herein can be measured by Mercury Pressing Filling Method in compliance with J. TAPPI Paper Pulp Testing Method No. 48-85. By this method, void volume VV (cc/m$^2$) can be measured. Then, the void ratio VR can be obtained by the following formula:

$$VR=(VV/(T\times A)\times 100$$

where T is the thickness of the coating layer and A is a unit area.

When the void ratio is at least 40 percent, a sufficient rate of ink absorption is obtained, and when it is no more than 80 percent, cracks of the ink absorptive layer, which tend to be formed at low humidity, during storage, and the like, are minimized.

In order to enhance ink absorbability by increasing the void ratio and simultaneously to enhance ink fixability, the ink absorptive layer is preferably comprised of fine solid particles. Listed as such fine solid particles employed in the ink absorptive layer are, for example, calcium carbonate, calcium sulfate, magnesium hydroxide, basic magnesium carbonate, alumina, aluminum hydroxide, synthetic silica, silicates such as calcium silicate, aluminum hydroxide, barium sulfate, titanium oxide, zinc carbonate, zinc oxide, silicon oxide, zeolite, lithopone, and the like.

Listed as water-soluble organic polymeric compounds which are employed to disperse such fine solid particles and prepare the ink absorptive layer are, for example, gelatin, polyvinylpyrrolidone, sodium polyacrylate, polyvinyl alcohol, and modified products thereof, starch and modified products thereof, oxidized starch, etherified starch, vinyl acetate, cellulose derivatives such as carboxymethyl cellulose, hydroxyethyl cellulose, and the like, casein, soybean protein, silyl modified polyvinyl alcohol; acryl based copolymer latex such as maleic anhydride resins, styrene-butadiene copolymers, methyl methacrylate-butadiene copolymers, and the like; vinyl based copolymer latex such as ethylene-vinyl acetate copolymers; or functional group modified polymer latexes prepared by modifying these various types of polymers with monomers containing a functional group such as a carboxyl group; water-soluble organic polymers (water-soluble polymers) such as thermally hardenable synthetic resins like urea resin and the like. These may be employed in combination of two types or more.

As fine solid particles employed in the absorptive layer, others than those described above may be employed which are synthesized in the presence of such water-soluble organic polymeric compounds as described in Japanese Patent Publication Open to Public Inspection No. 9-164761.

In this case, organic substances, which may be employed as synthetic raw materials for said fine solid particles, are not particularly limited. However, preferably employed are aluminum sulfate, aluminum nitrate, aluminum chloride, and analogous aluminum salts thereof, alkali metal aluminates such as sodium aluminate, or potassium aluminate, or aqueous solution of water-soluble aluminum compounds such as those, silicon salts such as sodium silicate, metal alkoxides such as aluminum isoproxide, tetraethoxysilane, and the like.

The diameter of said fine solid particles is preferably between 0.003 and 2 μm, is more preferably between 0.005 and 0.5 μm, and is much more preferably not larger than 0.2 μm.

Said fine solid particles are preferably provided with pores which relate to the rate of ink absorption as well as ink absorption capacity. The average diameter of said pores is preferably between 20 and 40 Å, and is more preferably between 40 and 200 Å.

The volume of said pores is preferably between 0.5 and 5.0 cc/g, and is more preferably between 1.0 and 2.5 cc/g.

Further, the configuration of said pores is preferably uniform and linear, exhibiting few maze-like paths. From the viewpoint of the rate of ink absorption, an ink bottle shape having a narrow inlet, a gourd shape having a constriction in the middle, a winding shape, and the like are not preferred.

The thickness of the ink absorptive layer is precisely determined depending on the ink used, as well as the type of solvents thereof, the ink volume, and the like, and is preferably between 5 and 50 μm. In the case that there is a plurality of ink absorptive layers, it may be preferable that the total thickness of the plurality of ink absorptive layers is 5 μm to 50 μm. When the thickness is less than the lower limit, images suffer from bleeding due to insufficient absorbability. On the contrary, when the thickness is beyond the upper limit, the absorbability is excessively high, and the density of images may decrease due to absorption and retention of dyes. Thus, neither of the two is preferred.

Regarding the employed ratio of fine solid particles to binders, an excessive large ratio of the binders is not naturally preferred because highly detailed images cannot be fully produced due to the presence of said fine solid particles. Due to that, the employed amount of binders was determined to be between 0 and about 50 percent by weight with respect to the total weight of said fine solid particles and further, was suitably determined to be between 5 and 20 percent by weight.

In the present invention, suitably added as other additives, which may be added to the ink absorptive layer, are dispersing agents for fine solid particles of the present invention, thickening agents, fluidity improving agents, antifoaming agents, foam inhibitors, releasing agents, foaming agents, penetrating agents, coloring dyes, coloring pigments, fluorescent whitening agents, UV absorbers, antioxidants, antiseptics, mildewcides, water proofing agents, wet paper strength enhancing agents, dry paper strength enhancing agents, and the like.

In the ink jet recording sheet of the present invention, it is not necessary that the ink absorptive layer be composed of a single layer, but may be composed of a plurality of layers. In such a case, among the sublayer and the ink absorptive layer, the Young's modulus of the layer directly adjacent to the sublayer should satisfy the relationship specified by the present invention. It may be most preferable that the Young's modulus of the subbing layer (the first layer) is lower than that of each of the plurality of ink absorptive layers provided on the first layer.

Listed as supports employed in the present invention are paper, thermoplastic resin film, synthetic paper, synthetic resin laminated paper such as paper supports laminated with polyethylene on both surfaces, and sheet-like materials such as nonwoven fabric mainly composed of wood fiber and synthetic fiber. In the case of paper, internal sizing agents may or may not be added, and sizing agents such as neutral sizing agents, polymer sizing agents, acidic sizing agents, and the like may be employed individually or in combination. Fillers may or may not be added. Further, there is no limitation in that a sizing press may or may not be applied. Employed as internal fillers and white pigments for paper supports are pigments which are known in the art and which may be employed individually or in combination. Examples include inorganic white pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithopone, zeolite, magnesium carbonate, magnesium hydroxide, and organic pigments such as styrene based plastic pigments, acryl based plastic pigments, polyethylene, microcapsules, urea resins, and melamine resins. Further, when said support is composed of paper, it is preferred that neutral sizing agents as well as fillers be incorporated, the ratio of the wood pulp to fillers to be between 70 and 90 percent by weight, and the paper weight to be between 60 and 120 g/m$^2$. However, these are not subject to any particular limitation.

The ink jet recording sheet of the present invention may be prepared in such a manner that after obtaining the aforementioned sheet for a support, a sublayer is applied onto said sheet employing a dip coating method, a bar coating method, a blade coating method, an air knife coating method, utilizing a slide coating device, a curtain coating method, and the like, it is subsequently dried, and thereafter, the aforementioned ink absorptive layer is successively coated onto the resulting layer. Preferably, however, the sublayer and the ink absorptive layer may be simultaneously multilayer-coated, employing a curtain coater as described in, for example, Japanese Patent Publication No. 49-24135, and Japanese Patent Publication Open to Public Inspection No. 6-183132, or a slide coater as described in U.S. Pat. Nos. 2,761,419, 2,761,791, 5,849,363, 5,843,530, and 5,736,067.

In said curtain coater, a coating solution drops from a coating lip to form a vertical curtain and coating is carried out by bringing the resulting curtain into contact with a moving support. Since the gap from the lip to the coating surface is relatively large, the curtain coating method minimizes coating problems due to coagula and foreign matter. Further, the curtain coating method is capable of being carried out for simultaneous multilayer coating by forming a gravitationally falling curtains which is formed by combining a plurality of falling layers so as to face with each other. Said curtain coater exhibits relatively large tolerance range for relative thickness, viscosity differences, and the like, in various coating solutions, and thus is preferably employed to carry out simultaneous multilayer coating to prepare the ink jet recording sheet of the present invention.

Cited as another preferred simultaneous multilayer coating method is one which employs a slide coater. In the slide coating method, a slide hopper is employed, and a coating surface is subjected to multilayer bead coating. This coating method is detailed in U.S. Pat. Nos. 2,761,419, 2,761,791, and others. In order to consistently carry out multilayer bead coating, it is critical to realize the uniformity of the gap distance between the hopper lip and the coating surface. It is commonly required to control said gap to be very small.

However, coating layers, which exhibit firm layer adhesion and result in fewer cracks, are obtained employing these simultaneous multilayer coating methods.

Regarding drying temperature, maximum heating temperature is at least 50° C., is preferably at least 60° C., and is preferably not higher than 70° C. However, the temperature is not particularly limited.

EXAMPLES

The present invention is described in detail with reference to examples. However, the embodiments of the present invention are not limited to these examples.

Example 1

A gelatin sublayer (having a dry thickness of 0.1 μm) was applied in a coating amount of 0.1 g/m$^2$ onto the titanium dioxide containing side of a reflection support prepared by laminating an 80 g/m² paper support with polyethylene on both sides (having a thickness of polyethylene of 130 μm, and containing 7 percent by weight of titanium dioxide with respect to polyethylene in the polyethylene layer on the ink receptive layer side).

Ink Absorptive Layer Coating Solution 1

A slurry prepared by mixing porous silica gel powder (Carplex FPS-3, manufactured by Shionogi Seiyaku Co., Ltd.) with gelatin was adjusted so as to obtain a solid portion ratio of 5/1. A coating solution was thus obtained.

Ink Absorptive Layer Coating Solution 2

Placed in a glass reaction vessel having a capacity of 3000 cc were 760 cc of water and 440 cc of IPA (isopropyl alcohol) and mixed. The resulting solution was heated to 68° C. When the temperature was kept constant, 412 g of tetraethoxysilane were added while stirring over an extended time. The resulting mixture was subjected to hydrolysis at a solution temperature of 80 to 85° C. for 12 hours, while the rate of stirring was continually kept constant. Thereafter, the temperature was raised to 95° C., and 10.3 g of sulfuric acid were added, and peptization was carried out at 85° C. for 55 hours (during peptization, was slightly subjected to ultrasonic dispersion). The total volume was then reduced to 750 g by concentration. Thus a white silica sol was obtained.

Docecylbenzenesulfonic acid was added to 90 weight parts of the aforementioned silica gel, and the resulting mixture was subjected to ultrasonic dispersion for 15 minutes. An aqueous gelatin solution was added to the resulting dispersion so as to obtain a solid portion ratio of 10/1. When these complexes were formed and a gel was formed, 100 weight parts of water was added, and the resulting mixture was vigorously stirred for several tens of minutes to obtain a complex dispersion as the desired coating solution.

Ink Absorptive Layer Coating Solution 3

Placed in a glass reaction vessel having a capacity of 3000 cc were 440 cc of IPA (isopropyl alcohol), and was heated to 45° C. With the temperature kept constant, 412 g of tetraethoxysilane were added along with a dispersing agent while stirring over several hours. Added to the resulting solution was a gelatin solution prepared by dissolving 41 g of gelatin in 760 cc of water, while maintaining a solution temperature at 40° C. The resulting mixture was subjected to hydrolysis for 36 hours, while the rate of stirring was continually kept constant. Thereafter, the temperature was raised to 60° C., and 10.3 g of sulfuric acid were added, and peptization was carried out at 50° C. for 75 hours (during peptization, was slightly subjected to ultrasonic dispersion). The total volume was then reduced to 750 g by concentration, so that minute yellowish white solid particles (gelatin-silica sol A) were obtained.

Added to fine solid particles (gelatin silica sol A), prepared according to the aforementioned method, was 10 weight percent gelatin solution, and the resulting mixture was adjusted so as to obtain a solid portion ratio of silica/gelatin of 5/1. Thus a dispersion was obtained to be used as a coating solution.

Each of the aforementioned Ink Absorptive Layer Coating Solutions 1 through 3 was applied onto the aforementioned support onto which a gelatin sublayer had been applied to obtain a layer thickness after drying of 30 μm, employing a bar coater, and subsequently dried. Thus Sample Nos. 1, 2, and 3, provided with the ink absorptive layer having a void structure shown in Table 1, were prepared.

A sublayer (with a dry thickness of 0.1 μm) comprised of polyvinyl alcohol (PVA 117, manufactured by Kuraray Co.) was applied in a coating amount of 0.1 g/m² to the titanium dioxide containing side of a reflection support prepared by laminating the aforementioned 80 g/m² paper support with polyethylene on both sides (with a thickness of polyethylene of 130 μm, and containing 7 percent by weight of titanium dioxide with respect to polyethylene in the polyethylene layer on the ink receptive layer side). Then, each of the aforementioned coating solutions 1, 2, and 3 was applied onto the resultant sublayer. Thus, Ink Jet Recording Sheet Sample Nos. 4 through 12, provided with an ink absorptive layer having a void structure shown in Table 1 were prepared. During said preparation, the elastic modulus was adjusted so as to obtain the Young's modulus shown in Table 1 by adding boric acid to the polyvinyl alcohol sublayer.

Further, the elastic modulus of each layer was measured as follows. Each coating solution was applied to the surface of a polypropylene plate and subsequently dried. The coated film was then peeled off and a 200 μm thick film was prepared. The Young's modulus of the resulting film was measured at 25° C. and 60% RH, employing a tension tester (Tensiron RTC-1210A, marketed by Orientech Co., Ltd.).

Each sample was subjected to a test print run employing cyan ink, and a microphotograph of the printed part with a magnification factor of 50 was taken. Then, cracks on the coating layer were visually evaluated employing the resulting photograph.

Evaluation standards were as follows:
AA: cracks were non-existent
A: cracks were slight
B: cracks were visible only in some areas
C: many cracks were visible Table 1 below shows the Young's modulus as well as observation results of the crack formation after coating and drying of each layer.

TABLE 1

| Sample No. | Solution No. | Sublayer | Ink Absorptive Layer Young's Modulus in kg/mm² | Sublayer Young's Modulus in kg/mm² | Cracks | Void Ratio in % | Fine Particles/Binder | |
|---|---|---|---|---|---|---|---|---|
| 1 | 1 | GEL | 63 | 140 | C | 63 | 5/1 | Comp. |
| 2 | 2 | GEL | 65 | 140 | C | 65 | 10/1 | Comp. |
| 3 | 3 | GEL | 61 | 140 | C | 59 | 5/1 | Comp. |
| 4 | 1 | PVA | 63 | 70 | B | 63 | 5/1 | Comp. |
| 5 | 2 | PVA | 65 | 70 | B | 65 | 10/1 | Comp. |
| 6 | 3 | PVA | 61 | 70 | B | 59 | 5/1 | Comp. |
| 7 | 1 | PVA | 63 | 55 | AA | 63 | 5/1 | Inv. |

TABLE 1-continued

| Sample No. | Solution No. | Sublayer | Ink Absorptive Layer Young's Modulus in kg/mm² | Sublayer Young's Modulus in kg/mm² | Cracks | Void Ratio in % | Fine Particles/ Binder | |
|---|---|---|---|---|---|---|---|---|
| 8  | 2 | PVA | 65 | 55 | AA | 65 | 10/1 | Inv. |
| 9  | 3 | PVA | 61 | 55 | AA | 59 | 5/1  | Inv. |
| 10 | 1 | PVA | 63 | 30 | AA | 63 | 5/1  | Inv. |
| 11 | 2 | PVA | 65 | 30 | AA | 65 | 10/1 | Inv. |
| 12 | 3 | PVA | 61 | 30 | AA | 59 | 5/1  | Inv. |

Note Solution No.: Ink absorptive layer coating solution No.
Comp.: Comparative, Inv.: Present invention Example 2

Subsequently, the same ink absorptive layer as in Sample No. 7 in Table 1 and each of the polyvinyl alcohol sublayers having varied coating amounts shown in Table 2 were applied to the support in Example 1. The Young's modulus of the resulting polyvinyl alcohol layer was measured employing the aforementioned measurement method, and a value of 55 kg/mm² was obtained. Further, the elastic modulus of the ink absorptive layer was 63 kg/mm².

Ink Absorptive Layer Coating Solution 1 of Example 1 was applied onto the resulting support and subsequently dried. Thereafter, cracks were also observed in the same manner as Example 1.

Further, regarding gloss, each of the ink jet sheets was visually observed. Evaluation was carried out based on two grades, that is, acceptable gloss (A) and dulled gloss with clouding (B).

Table 2 shows the obtained results.

TABLE 2

| Coating Amount of Sublayer in g/mm² | Cracks | Gloss |
|---|---|---|
| 0.01 | A  | A |
| 0.03 | AA | A |
| 0.1  | AA | A |
| 0.3  | AA | A |
| 0.5  | AA | B |

As can be seen in Table 2, the ink jet recording sheets of the present invention result in minimal cracks and exhibit acceptable gloss.

Example 3

The viscosity, surface tension and the like of the aforementioned Coating Solution 1, as well as a polyvinyl alcohol layer coating solution, to which a minimal amount of boric acid was added so as to obtain a Young's modulus of 40 kg/mm² after coating, were adjusted to the predetermined values, respectively. Thereafter, said coating solutions were simultaneously applied to the support employed in Example 1 so as to obtain the same coating amount as in Example 1, employing a curtain coater shown in FIG. 1 of Japanese Patent Publication Open to Public Inspection No. 183132. Thus an ink jet recording sheet was prepared.

The resulting ink jet recording sheet was subjected to printing employing cyan ink in the same manner as in Examples 1 and 2. Then, cracks in the printed area were visually observed. As a result, no crack was observed and an excellent finish resulted.

Example 4

The viscosity, surface tension and the like of the aforementioned Coating Solution 1, as well as a polyvinyl alcohol layer coating solution, to which a minimal amount of boric acid had been added so as to obtain a Young's modulus of 40 kg/mm² after coating, were adjusted to the predetermined values, respectively. Thereafter, said coating solutions were subjected to simultaneous multilayer coating onto the support employed in Example 1 so as to obtain the same coating amount as in Example 1, employing a slide coater described in U.S. Pat. No. 5,849,363. An ink jet recording sheet was thus prepared. The resulting ink jet recording sheet was subjected to printing employing cyan ink in the same manner as in Examples 1 and 2. Then, the printed area were visually observed. As a result, no crack was observed and an excellent finish resulted.

Example 5

The same polyvinyl alcohol sublayer as in Sample No. 10 of Example 1 was applied onto the same support as in Sample 10 of Example 1. Further, thereon, the coating solution of each layer was applied employing a slide hopper so as to obtain a dry thickness of the first layer of 8 μm, that of the second layer of 17 μm, and that of the third layer of 8 μm in that order from the support surface. The formula of each layer coating solution is described below.

"Preparation of Titanium Oxide Dispersion-1"

Twenty kg of titanium oxide having an average particle diameter of about 0.25 μm were added to 90 liters of a pH 7.5 aqueous solution comprising 150 g of sodium tripolyphosphate, 500 g of polyvinyl alcohol (PVA 235, manufactured by Kuraray Co., Ltd.), and 10 g of antifoaming agent SN381 marketed by Sun Nobuko Co., Ltd. The resulting mixture was dispersed employing a high pressure homogenizer (manufactured by Sanwa Kogyo Co., Ltd.). Then the total volume was adjusted to 100 liters to obtain uniform Titanium Oxide Dispersion-1.

"Preparation of Silica Dispersion-1"

Employing a jet stream-inductor mixer, TDS, manufactured by Mitamura Riken Kogyo Co., 125 kg of gas phase method silica (A300, prepared by Nihon Aerojiru Kogyo Co., Ltd.), having an average primary article diameter of 0.007 μm, were suction-dispersed at room temperature into 620 liters of pure water having a pH of 2.5, adjusted with nitric acid. The total volume was then adjusted to 694 liters employing pure water.

"Preparation of Silica Dispersion-2"

While stirring, added to 18 liters of an aqueous solution (at a pH of 2.3) comprising 1.63 kg of cationic polymer (P-1), 2.2 liters of ethanol, and 1.5 liters of n-propanol were 69.4 liters of Silica Dispersion-1, and 7.0 liters of an aqueous solution containing 260 g of boric acid and 230 g of borax were then added. Subsequently, 1 g of the aforementioned antifoaming agent SN381 was also added.

The resulting mixture was dispersed employing a high pressure homogenizer manufactured by Sanwa Kogyo Co., Ltd., and the total volume was adjusted to 97 liters, employing pure water to prepare Silica Dispersion-2.

Cationic Polymer P-1

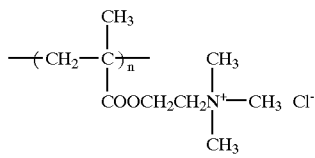

"Preparation of Fluorescent Whitening Agent Dispersion-1"

While heating, dissolved in 9,000 g of diisodecyl phthalate and 12 liters of ethyl acetate were 400 g of oil-soluble fluorescent whitening agent Uvitex-OB manufactured by Ciba-Geigy Co. Added to 65 liters of an aqueous solution containing 3,500 g of acid process gelatin, and 6,000 ml of a 50 percent aqueous saponin solution was the resulting solution, and mixed. The resulting mixture was emulsifying-dispersed employing a high pressure homogenizer manufactured by Sanwa Kogyo Co., Ltd. Then ethyl acetate was removed under reduced pressure and the total volume was adjusted to 100 liters.

"Preparation Matting Agent Dispersion-1"

Added to 7 liters of pure water, containing 3 g of the aforementioned PVA 235, were 156 g of methacrylic ester based monodispersed matting agent MX-15000H manufactured by Sohken Kagaku Co., Ltd., and the resulting mixture was dispersed employing a high-speed homogenizer. The total volume was then adjusted to 7.8 liters.

"Preparation of Coating Solutions"

First, second, and third layer coating solutions were prepared according to the following steps.

First Layer Coating Solution

The following additives were successively added to 600 ml of Silica Dispersion-2, while stirring at 40° C.

| | |
|---|---|
| 10% Aqueous solution of polyvinyl alcohol (PVA 203, manufactured by Kuraray Kogyo Co., Ltd.) | 0.6 ml |
| 5% Aqueous solution of polyvinyl alcohol (PVA 235, manufactured by Kuraray Kogyo Co., Ltd.) | 260 ml |
| Fluorescent Whitening Agent Dispersion-1 | 25 ml |
| Titanium Oxide Dispersion-1 | 33 ml |
| Latex Emulsion AE-803, manufactured by Daiichi Kogyo Co., Ltd. | 18 ml |
| Pure water to make | 1000 ml |

Second Layer Coating Solution

Successively mixed with 650 ml of Silica Dispersion-2 were the following additives, while stirring at 40° C.

| | |
|---|---|
| 10% Aqueous solution of polyvinyl alcohol (PVA 203, manufactured by Kuraray Kogyo Co., Ltd.) | 0.6 ml |
| 5% Aqueous solution of polyvinyl alcohol (PVA 235, manufactured by Kuraray Kogyo Co., Ltd.) | 270 ml |
| Fluorescent Whitening Agent Dispersion-1 | 35 ml |
| (4) Pure water to make | 1000 ml |

Third Layer Coating Solution

Successively mixed with 650 ml of Silica Dispersion-2 were the following additives, while stirring at 40° C.

| | |
|---|---|
| 10% Aqueous solution of polyvinyl alcohol (PVA 203, manufactured by Kuraray Kogyo Co., Ltd.) | 0.6 ml |
| 5% Aqueous solution of polyvinyl alcohol (PVA 235, manufactured by Kuraray Kogyo Co., Ltd.) | 270 ml |
| Silicone dispersion (By-22-839, manufactured by Toray-Dow Corning-Silicone Co, Ltd.) | 15 ml |
| 50% Aqueous saponin solution | 4 ml |
| Matting Agent Dispersion-1 | 10 ml |
| Pure water to make | 1000 ml |

Coating solutions as described above were filtered employing the filters described below.

First layer and second layer: 2 filtering stages employing TCP 10 manufactured by Toyo Roshi Co., Ltd.

Third layer: 2 filtering stages employing TCP 30 manufactured by Toyo Roshi Co., Ltd.

It was confirmed that the prepared ink absorptive layers had a void structure (void ratio: 58%). The void ratio as described herein was obtained by Mercury Pressing Filling Method in compliance with J. TAPPI Paper Pulp Testing Method No. 48-85. By this method, void volume VV was measured, and then, the void ratio VR was obtained by the following formula:

$$VR=(VV/(T\times A))\times 100$$

where T is the thickness of the coating layer and A is a unit area.

The coated film, after drying, was observed. No crack was found and an excellent film surface was obtained. The Young's modulus of the polyvinyl alcohol sublayer and each layer are shown in Table 3. The Young's modulus of the sublayer is decreased than the first ink absorptive layer. Accordingly, it is estimated that effects, exhibited with relaxation of the contraction stress which is generated during drying of the ink absorptive layer. In particular, the Young's modulus of all ink absorptive layer is lower than that of the sublayer and excellent effect can be obtained.

Further, in the present Example, PVA was employed in the ink absorptive layer as the binder. Thus, the resulting ink absorptive layer exhibited high affinity with the sublayer to result in excellent adhesion. Due to that, in terms of the prevention of cracks, higher and more desirable effects were exhibited.

TABLE 3

| | Young's Modulus in kg/mm² |
|---|---|
| Sublayer | 30 |
| Ink Absorptive Layer Uppermost Layer | 53 |
| Ink Absorptive Layer Intermediate | 58 |

TABLE 3-continued

| Layer | Young's Modulus in kg/mm² |
|---|---|
| Ink Absorptive Layer Lowest Layer | 61 |

It is possible to obtain an ink jet recording sheet which results in no minute cracks during drying, and exhibits excellent coated film strength as well as excellent glossiness and to obtain high quality ink jet recording images.

What is claimed is:

1. An ink-jet recording medium, comprising:
    a support;
    a first layer provided on the support; and
    a second layer provided on the first layer so as to come in contact with the first layer, the second layer being an ink absorbing layer,
    wherein a Young's modulus of first layer is smaller than a Young's modulus of the second layer and a coating weight of the first layer is 0.03 g/m² to 0.4 g/m².
2. The ink jet recording medium of claim 1, wherein the first layer is a subbing layer.
3. The ink jet recording medium of claim 1, wherein the second layer comprises a void structure.
4. The ink jet recording medium of claim 1, wherein
    the first layer comprises an organic polymer and the second layer contains the same organic polymer as that of the first layer.
5. The ink jet recording medium of claim 1, wherein the first layer contains polyvinyl alcohol.
6. The ink jet recording medium of claim 1, wherein a thickness of the second layer is 5 $\mu$m to 50 $\mu$m.
7. The ink jet recording medium of claim 1, wherein a thickness of the first layer is 0.03 $\mu$m to 0.4 $\mu$m.
8. The ink jet recording medium of claim 1, wherein a thickness of the second layer is larger 10 times or more than that of the first layer.
9. A method of manufacturing an ink jet recording medium, comprising:
    a step of providing a second layer on a first layer provided on a support, wherein the second layer is an ink absorbing layer and has a Young's modulus larger than that of the first layer.
10. The method of claim 9, wherein the step of providing the second layer comprises a step of coating a coating solution on the first layer and a step of drying the coating solution so as to obtain the second layer.
11. The method of claim 9, further comprising a step of providing the first layer on the support before the step of providing the second step.
12. The method of claim 9, wherein the first layer is a subbing layer.
13. The method of claim 9, wherein the second layer is provided by simultaneously coating with the firs layer so as to form a multi layer.
14. The method of claim 9, wherein the simultaneously coating is conducted with a curtain coater.
15. The method of claim 9, wherein the simultaneously coating is conducted with a slide coater.
16. The method of claim 9, wherein in the step of providing the second layer, the second layer having a void structure is provided.

* * * * *